United States Patent [19]

Leorat

[11] Patent Number: 4,884,057

[45] Date of Patent: Nov. 28, 1989

[54] PUSH BUTTON AUTOMATIC TRANSMISSION CONTROL DEVICE

[75] Inventor: Francois Leorat, Versailles, France

[73] Assignee: Regie Nationale des Usines Renault, Boulogne Billancourt, France

[21] Appl. No.: 64,469

[22] Filed: Jun. 22, 1987

[30] Foreign Application Priority Data

Jun. 20, 1986 [FR] France ................................ 86 08906

[51] Int. Cl.$^4$ .............................................. B60Q 1/00
[52] U.S. Cl. ................... 340/456; 74/483 PB; 307/10.1
[58] Field of Search ............ 340/52 R, 438, 456, 340/441; 307/10 R; 180/336, 70.1; 74/483 PB, 754

[56] References Cited

U.S. PATENT DOCUMENTS

| | | |
|---|---|---|
| 2,610,518 | 9/1952 | Goedeke et al. ............... 74/483 PB |
| 2,933,945 | 4/1960 | Brewster et al. ............... 74/483 PB |
| 3,141,350 | 7/1964 | Bevacqua et al. ............... 74/483 PB |
| 3,983,405 | 9/1976 | Donovan ............................ 307/10.1 |
| 4,448,276 | 5/1984 | Nakamoto et al. ................... 180/90 |
| 4,648,290 | 3/1987 | Dunkley ............................. 340/456 |
| 4,790,204 | 12/1988 | Tury et al. ..................... 74/483 PB |

FOREIGN PATENT DOCUMENTS

| | | |
|---|---|---|
| 0070762 | 1/1983 | European Pat. Off. . |
| 0096352 | 12/1983 | European Pat. Off. . |
| 2437865 | 2/1975 | Fed. Rep. of Germany .... 340/52 R |
| 3146933 | 11/1982 | Fed. Rep. of Germany . |
| 2315408 | 1/1977 | France . |

OTHER PUBLICATIONS

Automotive Engineer, vol. 5, No. 6, decembre 1980, p. 14, Essex, GB; "News Scan", * p. 14, figures *.

Primary Examiner—Joseph A. Orsino
Assistant Examiner—Jill D. Jackson
Attorney, Agent, or Firm—Oblon, Spivak, McClelland, Maier & Neustadt

[57] ABSTRACT

An electromechanical device for easily selecting and engaging different driving modes while an automatic transmission of a motor vehicle is in a forward driving position. Push buttons are positioned so as to be within easy reach of a driver's fingers while the driver is operating the motor vehicle. Each push button corresponds to a particular driving mode. By pressing a push button the gear needed to effectuate the selected mode of operation is activated. The push buttons are electrically connected to a digital control means which controls the implementation and cancellation of the gears used for realizing the selected driving mode.

12 Claims, 4 Drawing Sheets

PUSH BUTTON AUTOMATIC TRANSMISSION CONTROL DEVICE

This invention relates to an automatic transmission electromechanical control device for a motor vehicle.

Motor vehicles equipped with an automatic transmission are provided in a standard way with a selection lever which makes it possible to select the mode of operation of the transmission.

In an almost universal manner, this selection lever, for a usual three-gear transmission, causes the following well-known positions to appear:

P: Parking position: the transmission is hydraulically declutched and mechanically locked in a positive way to have a parking brake that immobilizes the drive wheels;

R: Reverse position;

N: Neutral position: the transmission is hydraulically declutched;

D: Drive position: in which the entire automatic operation of the transmission is available;

2: only first and second gears are available by automatic operation, shiftings 2-3 being totally prohibited;

1: only first gear is possible, shiftings 1-2 and 2-3 being totally prohibited.

For four-speed automatic transmissions, an additional position "3" is generally introduced, in which only the first three gears are available by automatic operation, shiftings 3-4 being totally prohibited. Positions "1," "2," and "3" are currently called "selected gear positions," indicating thereby that they are selected by the driver who temporarily replaces automatic operation decisions.

Therefore, it can be seen that, depending on whether a three- or four-gear automatic transmission is involved, the selection lever should exhibit six or seven basic functional positions, to which can optionally be added complementary positions corresponding to optional functions.

For standard transmissions, whose automatic operation is purely hydraulic, the six or seven positions of the selection lever correspond to the same number of positions of the manual valve of the hydraulic distributor of the transmission, which thus distributes the working fluid in the specific hydraulic circuits achieving the various functions corresponding to the lever positions; therefore it is necessary to establish between the lever and the manual valve an exact one-to-one mechanical connection. In the same way, it is necessary to establish this same connection in transmissions with electromechanical control such as that described in the French Pat. No. 78-28437 to the extent that the position "1" involves a hydraulic implication.

The design drawbacks linked to this mechanical connection between selection lever and manual valve, because of the contradictory requirements it must meet, are known; precision in positioning the manual valve, limitation of the total travel of the lever, decoupling of vibrations between power train and lever, etc. Further, in the transmission with electromechanical control, the selection of gears is performed most often by a multiple function switch operated by the mechanism connected to the selector: depending on the rapidity of maneuvering of the selector by the driver, the transition times of a working contact to another of the switch vary considerably, which results in transmitting data from the switch to the transmission control computer only with considerable filtering precautions, which complicate the system and encumber its response time. Further, the ergonomic drawbacks are not less: difficulties or errors in selection, particularly during position changes when the vehicle is traveling and the driver cannot take his eyes off the road to see what gear he is putting the lever in. To mitigate these drawbacks, designers have resorted to various stratagems such as lateral or vertical baffles with retractable lock aimed at customizing the path for reaching the desired position by complicating the route; these arrangements at times are completed by mechanical and/or light repeaters placed in a suitable location for the driver's gaze. However, these remedies cannot totally mask the drawbacks intrinsically attached to an "on-line" selection command and to numerous positions.

On the other hand, if automatic transmissions are considered whose control is of the type described in French Pat. No. 84-14262, it is possible to take advantage of the fact that the selected gears do not require any specific hydraulic circuits and are controlled purely electronically; actually, under these conditions, only the three positions R, N or D of the selector are functionally connected to the manual valve, the P position being hydraulically and kinematically identical with that of the N position, and the positions of the selected gears can be the object of a separate processing.

The object of this invention is to take advantage of the functional independence between positions P, R, N, D, on the one hand, and the positions of the selected gears, on the other hand, to propose a solution mechanically, electronically and geometrically more satisfactory than the present standard solution with on-line control.

According to an embodiment of the invention, the automatic transmission electromechanical control device for a motor vehicle comprises a manual control mounted on a bar connected to the floor of the vehicle to assure static controls of the transmission, i.e., parking P, reverse R, neutral N and automatic drive position D.

Manual control is associated with a push button system to assure dynamic controls of the transmission, the push buttons being located close to the driver's fingers when he is holding the steering wheel, said push buttons acting on the control means only if the manual control selection lever is in the D position, these control means:

performing the order for a selected gear and possibly canceling another prior gear selection, during action on the corresponding push button;

canceling the order for a selected gear during a second action on the corresponding push button.

The effect of depressing any of the push buttons being canceled if the selection lever leaves position D.

According to an embodiment of the invention, the control means consist in as many circuits as there are selected gears, each gate comprising a switch, an OR circuit and a specific circuit whose output is connected to the management computer, the output of each of these switches being connected to the corresponding specific circuit and to the inputs of other OR gates, each of the OR circuits receiving also at the input signal $\overline{D}$ and being connected at the output to the corresponding specific circuit, so that each time that signal $\overline{D}$ is equal to 1, the specific circuits set their outputs at 0, and so that, when signal $\overline{D}$ is equal to 0 and a switch causes a pulse to appear, the output of the OR circuit corresponding to another previously imposed gear goes to 1 and the corresponding specific circuit sets its output at 0, the specific circuit corresponding to the switch which has just emitted a pulse making its output go from value 0 to value 1 or from value 1 to value 0.

According to an embodiment of the invention, each of the specific circuits comprises at its input a negated-input AND gate; the signal coming from the corresponding OR gate being sent to the input of two negated-input AND gates, NI henceforth meaning negated-input, the output of one of these two NI AND gates being the output of the specific circuit; the various NI AND gates being interconnected so that the leading edge of a pulse on the input of the specific circuit determines a new stable state at the output of the specific gate when the signal coming from the OR circuit is equal to 0, the trailing edge of this pulse leaving this new stable state unchanged.

According to an embodiment of the invention, each output of a specific circuit feeds an indicator light.

According to an embodiment of the invention, the push button system is mounted on a console fastened laterally to the steering wheel column on the side of the passenger seat, each push button corresponding respectively to each selected gear.

According to an embodiment of the invention, console (2) comprises a push button for declutching at stop.

According to an embodiment of the invention, a light repeater is associated with each push button.

According to an embodiment of the invention, the console comprises other control means.

According to an embodiment of the invention, the push button system is mounted on the visor of the dashboard.

According to an embodiment of the invention, the push buttons have an integrated indicator light.

The electromechanical control device according to the invention thus exhibits the advantage of dissociating the dynamic controls from the static controls of the automatic transmission, the dynamic controls being placed within finger reach of the driver so that he does not have to let go of the steering wheel.

The invention will be better understood thanks to the description of a particular embodiment described by way of nonlimiting example and illustrated by the accompanying drawings in which:

FIG. 1 symbolically describes the manual control associated with the invention;

Figure 2:
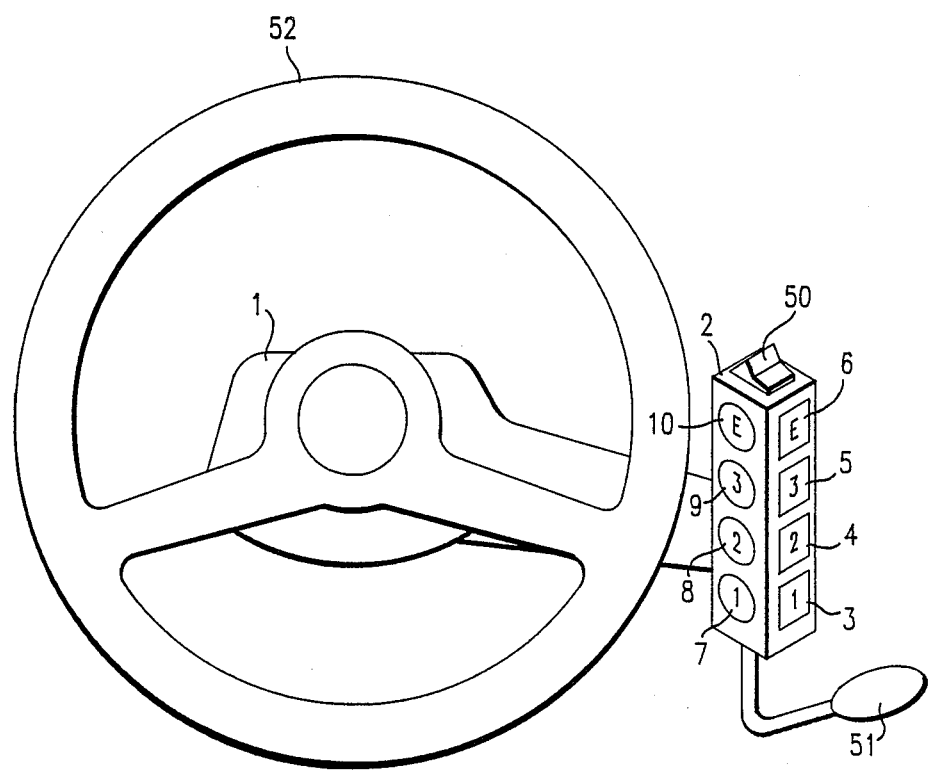
FIG. 2 shows a first mode of installation of the invention.

As shown in FIG. 2, the elements of the device according to the invention comprise a console 2 fastened laterally to steering wheel column 1 (exclusively, on the right for a vehicle with left-handed steering, on the left for a vehicle with right-handed steering) so that push buttons 3, 4, 5 and 6 are accessible to the finger tips without the thumb having to leave the rim 52 of the steering wheel. Push buttons 3, 4 and 5 correspond respectively to selected gears "1," "2," and "3," while push button 6 corresponds, in a nonlimiting way, to a complementary function, such as, for example, declutching at stop described in French Pat. No. 83-04636. Console 2 can advantageously be equipped with repeating indicator lights such as 7, 8, 9 and 10 corresponding respectively to push buttons 3, 4, 5 and 6 and can also support other control means 50 or 51 relating or not to the control of the automatic transmission. Console 2 thus groups all the dynamic control means of the automatic transmission.

Figure 1:
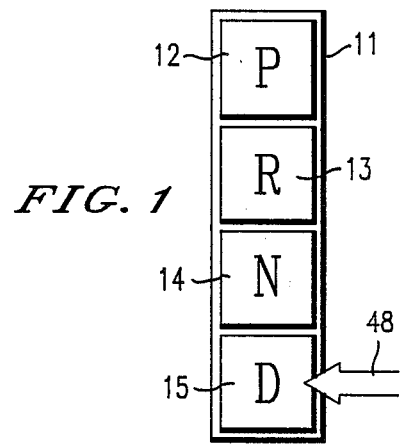

Further, the vehicle has a manual control shown as control display 11 (FIG. 1). The display is mounted, in a manner known in the art, on a bar connected to the floor of the vehicle (bar and mounting means are not shown). The manual control is special to the extent that it groups only the controls of a static nature of the transmission, namely, positions P referenced 12, R referenced 13, N referenced 14 and D referenced 15.

Figure 5:
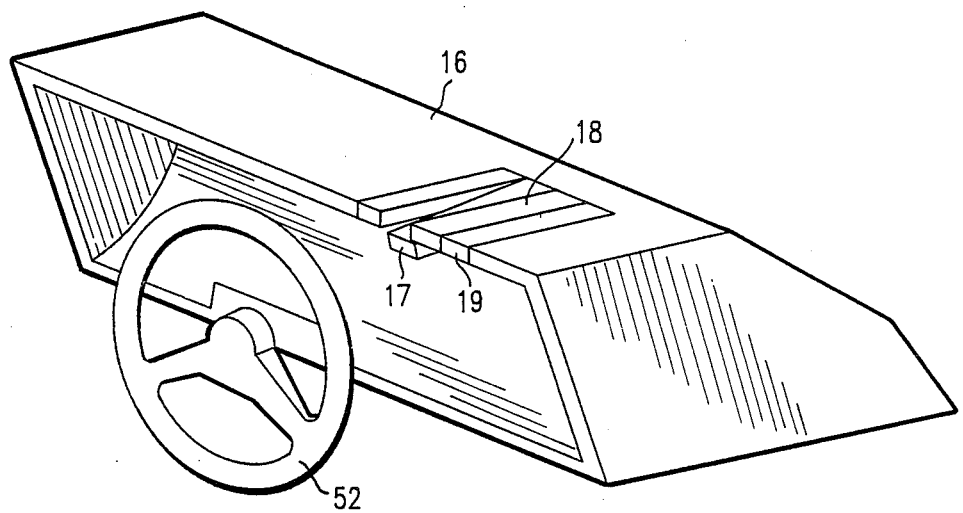
FIG. 5 shows another mode of installation of the invention.

According to another embodiment described in FIG. 5, the device according to the invention still comprises the manual control such as described above. On the other hand, rocking buttons 17, 18, and 19, with integrated indicator lights corresponding to selected gears 1, 2, and 3 are installed in the thickness of visor 16 of the dashboard, such that the rocking buttons are easily accessible to the fingertips without the thumb having to leave rim 52 of the steering wheel.

These two embodiments are not at all exclusive, and any other embodiment separating the static controls centralized on 11 from the dynamic controls so that these latter remain accessible to the fingertips from the steering wheel, falls under the principle of the invention.

Functionally, regardless of the way the device according to the invention is installed, depressing of one of the buttons 3, 4 or 5 should cancel the effect of a previous depressing of another of these buttons and engage the corresponding gear. Further, as soon as the selection lever, symbolized by 48 in FIG. 1, leaves position D, the effect of previous depressing of any of the buttons 3, 4 or 5 is canceled. To do this, a specific sequential logic circuit, symbolized in FIG. 4, is resorted to. An essential subcircuit of this circuit is described in detail in FIG. 3. The function of this specific circuit, which is referenced circuit 34, is to cause on its output S, referenced 53, the appearance of a signal which goes from value 1 (or from value 0) to value 0 ( to value 1 ) each time a pulse (whose generation is symbolized by switch 54 corresponding to switches 30, 31 and 32 in FIG. 4) appears on its input 49, output 53 always remaining at value 0 if input $\overline{D}$, referenced 55, is at 1, information D corresponding to the fact that the selector 48 is in position D ($\overline{D}$ corresponding to the fact that the selector is in one of the positions P, R, or N). To describe the functioning of this circuit conveniently, a start will be made from a state of this system where S=1 or $\overline{D}$=0, no pulse, moreover, being applied by switch 54 to input 49 of NI AND gate 20 which therefore has the value of 0, as well as input 49 of NI AND gate 22. The output of NI AND gate 20 has a value of 1, and it is transferred to the first inputs NI AND gates 21 and 23, whose outputs consequently have a value of 0. Since S=1, the output of NI AND gate 27, which is also the input of NI AND gate 22, has a value 0. The two inputs of NI AND gate 22 being zero, its output has a value of 1, which causes the outputs of NI AND gate 24 and NI AND gate 25 to be zero. The two inputs of NI AND gates 26 and 28 being zero, the output of each of these two latter circuits has a value of 1. Thus, it is verified that the state defined by S=1, $\overline{D}$=0 is stable.

If there is considered the leading edge of a pulse on input 49 of NI AND gate 20 by a momentary closing of switch 54, the output of NI AND gate 20 goes to 0, as well as the output of NI AND gate 22. The two inputs of NI AND gate 21 going to 0, the output of the latter circuit goes to 1, which causes the output of NI AND gate 24 and the output of NI AND gate 29 to remain at 0, just as the output of NI AND gate 28 remains at 1. The two inputs of NI AND gate 25 going to 0, the output of the latter circuit goes to 1, although the output of NI AND gate 26 goes to 0; consequently, signal S, which is the output of NI AND gate 26, switches to 0.

Therefore, it has just been seen that starting from a stable state defined by S=1 (with $\overline{D}$=0), the leading edge of a pulse on switch 54 determines a new stable state defined by S=0, ($\overline{D}$=0); and it would also be shown that this stable state has not been disturbed by the trailing edge of this same pulse. It would also be possible to show, in a similar way that, starting from the stable state defined by S=0 (with $\overline{D}$=0), a new pulse emitted by switch 54 restores the stable state defined by S=1, with ($\overline{D}$=0).

Further, it would also be shown that in the same way, one or the other stable state {S=0, $\overline{D}$=0} or {S=1, $\overline{D}$=0} having been attained on the leading edge of a pulse generated by switch 54, the trailing edge of this pulse leaves these stable states unchanged.

Finally, if $\overline{D}$=1, this means that the selection lever is in a position other than D, input 1 thus imposed on NI AND gate 28 and 26 forces their output to 0, which imposes the rest of the unit of circuit 34 to take the stable state corresponding to S=0, on the trailing edge of the pulse; if $\overline{D}$=1 disappears, state S=0 persists until the appearance of a new pulse on input 49.

As indicated above, circuits 34 are inserted in the complete circuit represented in FIG. 4, which extensively describes an embodiment of the invention for a transmission with three selected gears; a man of the art could easily generalize, from this diagram, the embodiment of the invention in the case of a transmission with any number of selected gears.

The three buttons for control of the selection of gears each activate a switch referenced 30, 31, and 32, corresponding respectively to the selected gears "1," "2," and "3," and the output of each of these switches is connected:
to a specific circuit 34,
to the inputs of two OR gates referenced 35 and 36 for switch 30, of two OR gates referenced 33 and 36 for switch 31, and to the inputs of two OR gates referenced 33 and 35 for switch 32.

Figure 3:
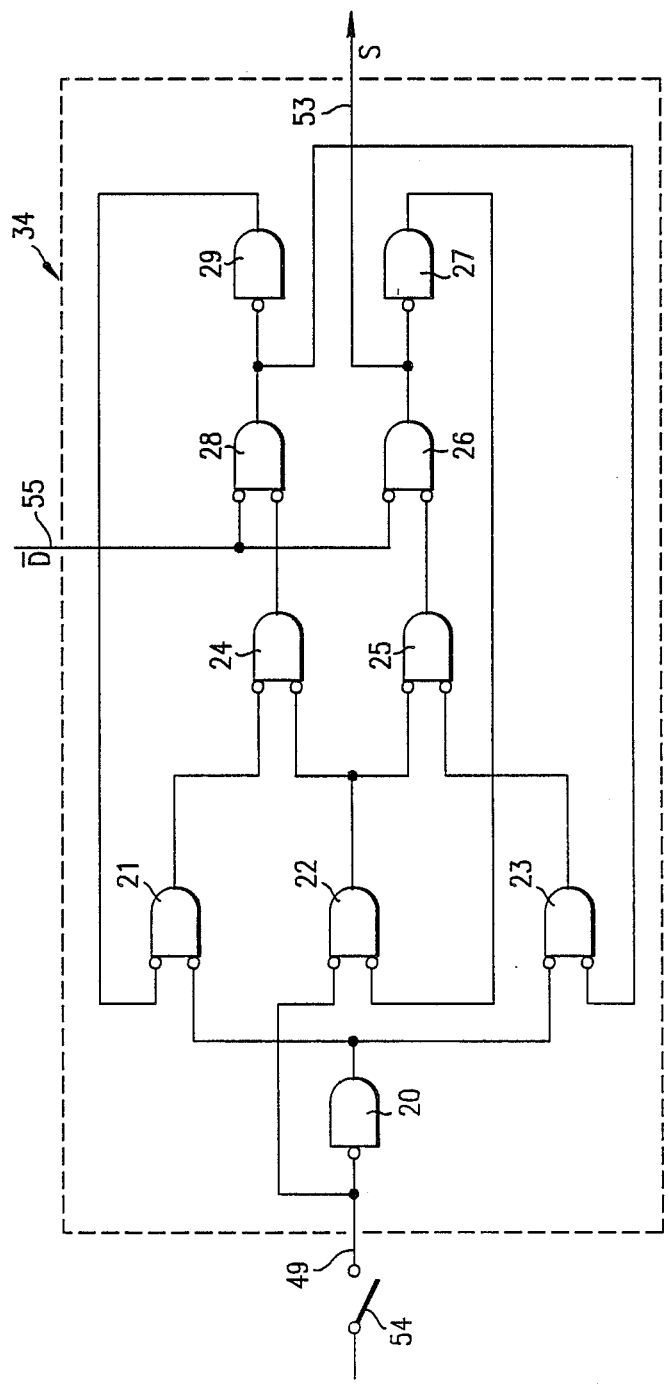
FIG. 3 and 4 show an embodiment according to the invention of a circuit for processing of signals coming from the selection buttons of the selected gears.
Figure 4:
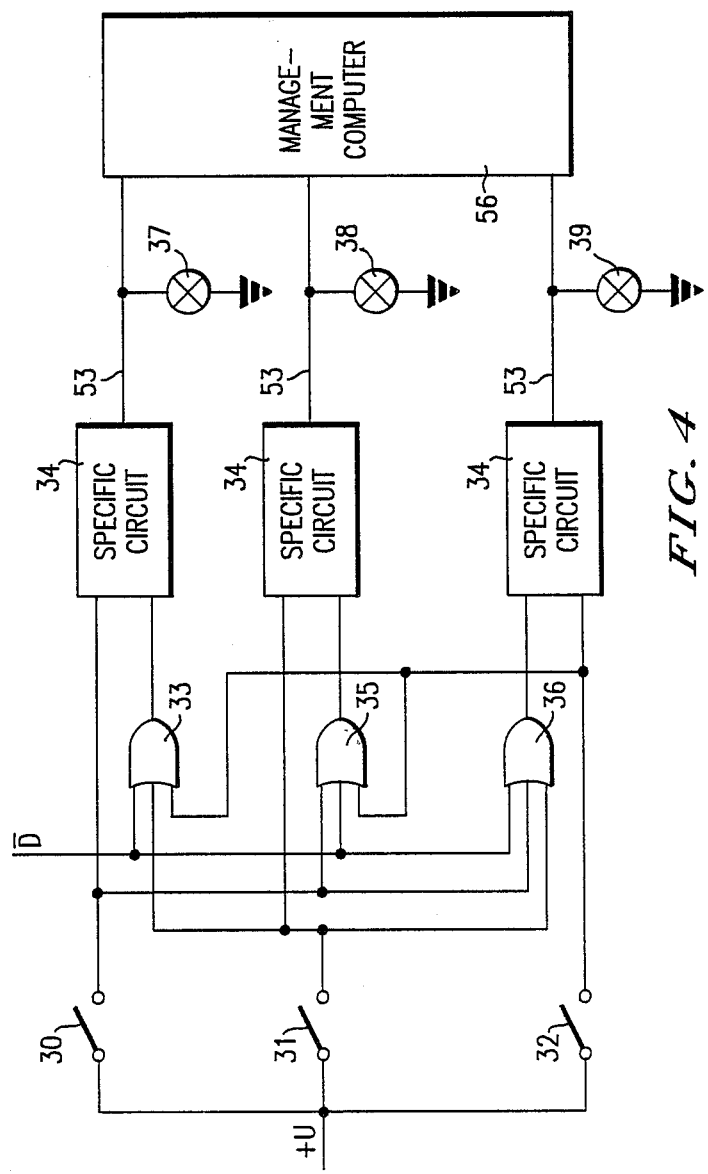

Each of the OR gates 33, 35 and 36 also receives at its input a signal $\overline{D}$ and each respective output is connected to corresponding circuit 34, instead of and in place of input $\overline{D}$ on the diagram of FIG. 3. Finally, specific circuits 34 supply, by their output, an indicator light 37, 38 and 39 corresponding respectively to the selected gears, and management computer 56 of the automatic transmission.

Each time signal $\overline{D}$ appears, circuits 34 set their output at 0, as seen above; any imposition of gears therefore is canceled as soon as selection gear 48 leaves position D.

As soon as any of switches 30, 31, 32 cause a pulse to appear, the signals on the outputs of the two OR circuits, which are connected to it, have the same effect as signal $\overline{D}$, so that:
pushing a button to select a particular gear cancels a previous gear selection;
it is possible to cancel the order for a gear selection by pressing a corresponding button twice in succession.

I claim:
1. An electromechanical control device for selecting and engaging a plurality of gears, located in an automatic transmission of a motor vehicle, while said motor vehicle is operated in a drive position comprising:
a plurality of push buttons positioned so that a driver of said motor vehicle can touch said plurality of push buttons with his fingers while holding a steering wheel;
a digital control means for engaging a particular gear of said plurality of gears corresponding to a driving mode selected by said driver when said driver pushes a designated push button of said plurality of push buttons, said plurality of push buttons being connected to said digital control means, and said digital control means functioning only when said motor vehicle is in a drive position.
2. A control device according to claim 1, wherein:
when said designated push button of said plurality of push buttons is selected, a previously selected gear of said plurality of gears is disengaged and said particular gear corresponding to said driving mode is engaged;
said driving mode is cancelled when said designated push button is pushed twice in succession; and
said driving mode is cancelled when said motor vehicle is operated other than in a drive position.
3. A control device according to claim 1, wherein:
each push button of said plurality of push buttons has a corresponding indicator light corresponding to an individual selected gear.
4. A control device according to claim 1, wherein:
said plurality of push buttons are mounted on a console fastened laterally to the column of said steering wheel on the passenger side of said motor vehicle.
5. A control device according to claim 4, wherein:
said console comprises activation means for activating other control means for controlling other operating systems of said motor vehicle.
6. A control device according to claim 1, wherein:
said plurality of push buttons are mounted on the dash board within easy access of said driver such that said driver can touch said plurality of push buttons with the fingers of one hand while holding the steering wheel with said driver's other hand.
7. A control device according to claim 6, wherein:
each push button of said plurality of push buttons has an integrated indicator light.
8. A control device according to claim 1, wherein said digital control means further comprises a plurality of electrical networks, each network of said plurality of electrical networks further comprising:
a specific circuit;
a switch connecting to an input of said specific circuit; and
an OR gate connected to a second input of said specific circuit, said OR gate having an input which receives a signal $\overline{D}$ such that each time signal $\overline{D}$ equals 1 said specific circuit has an output S of 0, and when signal $\overline{D}$ equals 0 and said switch causes a pulse to appear, the output of said OR gate goes to 1 and said specific circuit sets its output S at 0.
9. A control device according to claim 8, wherein:
a management computer connects to the output of said specific circuit.
10. A control device according to claim 8, wherein:

said specific circuit is comprised of a plurality of interconnected negated-input AND gates, said plurality of interconnected negated-input AND gates comprising a first negated-input AND gate acting as said input of said specific circuit.

11. A control device according to claim 8, wherein; said specific circuit for each network of said plurality of electrical networks has a corresponding selected gear.

12. A control device according to claim 11, wherein: the output of said specific circuit for each network of said plurality of electrical networks is connected to an indicator light.

* * * * *